Feb. 11, 1936.  M. GUGLIOTTA  2,030,292
BRAKING APPARATUS
Filed Nov. 21, 1934
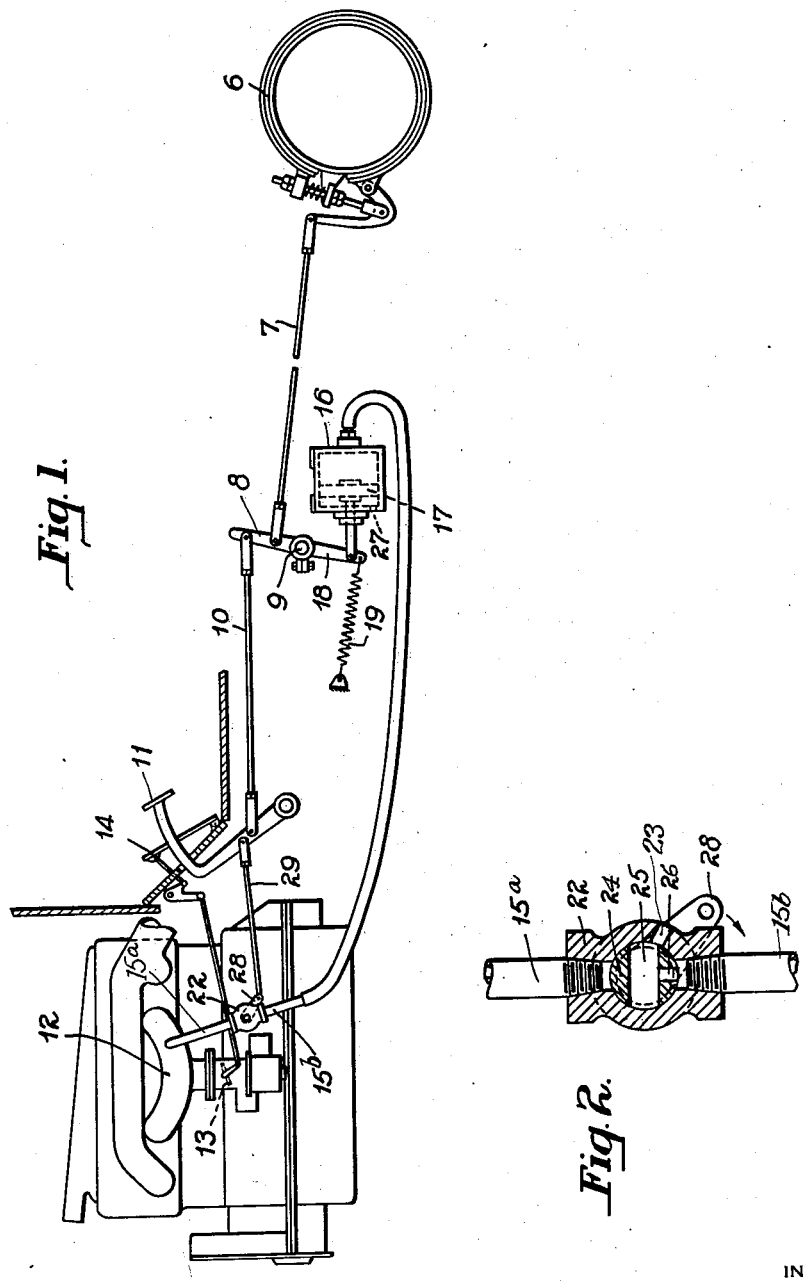
INVENTOR
Martin Gugliotta,
By Archworth Martin,
Attorney.

Patented Feb. 11, 1936

2,030,292

UNITED STATES PATENT OFFICE 2,030,292

BRAKING APPARATUS

Martin Gugliotta, Dilliner, Pa.

Application November 21, 1934, Serial No. 754,106

2 Claims. (Cl. 188—152)

My invention relates to braking apparatus and more particularly to vacuum-braking devices for use in connection with motor vehicles that are driven by internal combustion engines.

The invention constitutes an improvement upon those structures wherein the intake manifold has communication through a valve-controlled conduit with a braking cylinder whose piston is connected with manually-operated brake rigging, the piston of the brake cylinder being operated to apply the brakes, when the engine is throttled and a considerable degree of suction or vacuum is created within the intake manifold.

One object of my invention is to provide a structure wherein the brake pedal, when depressed to apply the brakes, will establish communication between the intake manifold and the braking cylinder to a desired degree, so that a predetermined amount of vacuum braking force is applied to the braking mechanism.

Another object of my invention is to provide a structure of the character referred to, wherein the braking force will be maintained at approximately a predetermined degree; without the necessity of the driver holding his foot on the brake pedal.

Still another object of my invention is to provide a braking system of the character referred to wherein the brakes will be automatically released upon opening of the throttle to accelerate the engine.

Referring to the accompanying drawing, Figure 1 is a longitudinal side view showing a general arrangement of the braking mechanism, and Fig. 2 is a view, on an enlarged scale, of the control valve of Fig. 1, showing such valve in position to cut off flow from the intake manifold to the brake cylinder.

The apparatus can be employed in connection with various types of vehicles and various forms of braking systems. As shown in the drawing, one of the brakes which may be of any well-known form is represented by the numeral 6. Through a link 7, a lever 8, a rock shaft 9, and a link 10, braking force is manually applied from the usual brake pedal 11.

The motor is provided with the usual intake manifold 12 that is controlled by a throttle valve 13, the throttle valve having the usual connections with an accelerator pedal 14.

A pipe 15a is tapped into the manifold 12, and communicates with a brake cylinder 16, that is suitably secured to the framework of a vehicle, in which framework the shaft 9 is journalled.

The cylinder 16 is provided with a piston 17 that is connected with a crank 18 which is secured to the shaft 9. The arm 8 being also secured to the shaft 9, such arm will be actuated, as a unit, with the arm 18. A spring 19 which is anchored at one end to the vehicle frame and at the other end has connection with the arm 18 serves to assist in returning the piston 17 to its retracted position.

Communication between the intake manifold 12 and the cylinder 16 through pipes 15a and 15b is controlled by a valve 22 that is interposed in the said line, and has a port 23 that communicates with the atmosphere. The valve is here shown as of the three-way type, embodying a plug 24 which has a main port or passageway 25, whose ends can be turned into full registry with the pipe sections 15a—15b to establish communication between the intake manifold and the brake cylinder.

As shown in Fig. 2, the plug 24 is positioned to entirely cut off suctional force on the brake cylinder; the small port 26 of the valve being so positioned that the brake cylinder is placed in communication with the atmosphere through the port 23, instead of communicating with the manifold.

Thus when the brake pedal 11 is in raised position as shown in Fig. 1, the valve 24 occupies the position shown in Fig. 2, and no suctional force is applied at the braking cylinder 16. The plug 24 is provided with an arm 28 to which an actuating rod 29 is connected, the rod 29 being connected to the brake pedal 11. Upon depression of the brake pedal 11, the valve is turned in a clockwise direction as indicated by the arrow, at which the large port 25 of the valve plug will be brought into registry with the pipes 15a and 15b, and at an intermediate position will have communication both with the port 23 and the pipe 15b, so that only partial suction will be transmitted to the brake cylinder through the pipe 15b. If only a small braking force is required, the pedal can be left at this position, and the brakes will remain applied with that particular degree of force, whether or not the driver maintains his foot on the pedal. This is of particular advantage in descending long grades, because the operator need not constantly hold the brake pedal down, and furthermore, the braking force will be exerted at a substantially constant degree by the brake cylinder. At fully set positions of the brakes, the port 25 will be in full registry with the pipes 15a and 15b. When the valve arm 28 is returned to the position shown in Fig. 2, the port 23 and the port 26 will function as relief ports for the brake cylinder. It will be obvious that the pedal can be depressed to any degree between zero braking pressure and full braking pressures.

In order to effect relief of vacuum force in the brake cylinder, and consequent release of the brakes, it is necessary only for the operator to press the accelerator pedal 14, to open the throttle valve and so reduce the suctional force in the intake manifold 12 that the spring 19 will return the piston 17 to retracted position and at the same time rock the shaft 9 so as to retract the brake pedal and restore the valve 25 to the position shown in Figs. 1 and 2.

When the piston 17 is advancing under suctional force, atmospheric air will enter the cylinder at the rear side of the piston through suitable openings 27. The vacuum condition existing in the line 15 and the brake cylinder 16 is relieved not only through acceleration of the motor, but by returning the valve to non-braking position, as shown for example in Fig. 4, where there is communication between the brake cylinder and the port 23 which will admit atmospheric air to the brake cylinder.

From the foregoing, it will be seen that I am enabled, by simply depressing the brake pedal, to automatically secure a desired degree of braking pressure, during deceleration of the motor, and that said braking pressure will be automatically maintained during the idling period. Furthermore, the brakes will be automatically released, simply by depressing the accelerating pedal.

I claim as my invention:—

1. The combination with a vehicle having an internal combustion engine that is provided with a throttle-controlled intake, a vacuum cylinder having a piston, a pipe connecting the cylinder to the said intake, a valve controlling flow through said pipe, braking apparatus for a vehicle, a manually-operable brake lever for applying the brakes, an operative connection between said piston and the braking apparatus, a spring normally maintaining the said piston and apparatus in brake-release position, these parts being so proportioned that in the presence of a vacuum condition in the cylinder, the piston will hold said apparatus in a braking position that is dependent upon the degree of vacuum in the cylinder, a connection between the brake lever and said valve, for opening the valve to establish communication between the said intake and the brake cylinder, when the brake lever is operated to apply the brakes, and a connection between the piston and the brake lever whereby they can have only synchronous movement, the said valve having a port which affords partial communication between said pipe and the atmosphere, simultaneously, when the brake lever is in an intermediate position and the valve is partially open.

2. The combination with a vehicle having an internal combustion engine that is provided with a throttle-controlled intake, a vacuum cylinder having a piston, a pipe connecting the cylinder to the said intake, a valve controlling flow through said pipe, braking apparatus for the vehicle, a manually-operable brake lever for applying the brakes, an operative connection between said piston and the braking apparatus, a spring normally maintaining the said piston and apparatus in brake-release position, these parts being so proportioned that in the presence of a vacuum condition in the cylinder, the piston will hold said apparatus in a braking position that is dependent upon the degree of vacuum in the cylinder, a connection between the brake lever and said valve, for opening the valve, to establish communication between the said intake and the brake cylinder, when the brake lever is operated to apply the brakes, and a connection between the piston and the brake lever whereby they can have only synchronous movement, the valve being provided with a port which, when the brake lever is fully depressed, will provide full communication between the manifold and the cylinder, and also provided with a port which will communicate with the atmosphere to a degree dependent upon the position of the brake lever, when the first-named port is only partially open.

MARTIN GUGLIOTTA.